United States Patent
Ursich et al.

(10) Patent No.: US 9,718,503 B2
(45) Date of Patent: Aug. 1, 2017

(54) COUNTER-TORQUE ROLLOVER PREVENTION ARCHITECTURE

(71) Applicants: Gavin Ursich, Willowick, OH (US); Jonathan Mark Secaur, Kent, OH (US)

(72) Inventors: Gavin Ursich, Willowick, OH (US); Jonathan Mark Secaur, Kent, OH (US)

(*) Notice: Subject to any disclaimer, the term of this patent is extended or adjusted under 35 U.S.C. 154(b) by 0 days.

(21) Appl. No.: 14/732,628

(22) Filed: Jun. 5, 2015

(65) Prior Publication Data
US 2015/0353150 A1  Dec. 10, 2015

Related U.S. Application Data

(60) Provisional application No. 62/008,928, filed on Jun. 6, 2014.

(51) Int. Cl.
*B62D 37/04* (2006.01)
*B60R 21/13* (2006.01)
*B62D 53/08* (2006.01)

(52) U.S. Cl.
CPC .............. *B62D 37/04* (2013.01); *B60R 21/13* (2013.01); *B62D 53/0871* (2013.01); *B60G 2400/0511* (2013.01)

(58) Field of Classification Search
CPC .... B62D 37/04; B62D 37/06; B62D 53/0871; B62D 53/0878; B60R 21/13; B60G 2400/0511; B60G 21/0555; B60G 2800/9122; B60G 2800/9124; Y10T 74/1296
See application file for complete search history.

(56) References Cited

U.S. PATENT DOCUMENTS

| | | | | |
|---|---|---|---|---|
| 1,513,143 A * | 10/1924 | Welch | ............... | A63H 11/14 446/233 |
| 1,687,296 A * | 10/1928 | Johnson | ............... | B62D 37/04 280/759 |
| 1,853,069 A * | 4/1932 | Minorsky | ............... | B63B 39/02 114/124 |
| 2,815,960 A * | 12/1957 | Zapelloni | ............... | B62D 37/04 280/124.103 |
| 3,466,935 A * | 9/1969 | Lanni | ............... | G01C 19/46 74/5.41 |
| 3,511,454 A * | 5/1970 | Hamilton | ............... | B64C 1/00 180/282 |
| 3,526,795 A * | 9/1970 | Pecs | ............... | B64G 1/283 244/165 |
| 3,909,044 A * | 9/1975 | Henzel | ............... | B60T 7/20 188/112 A |
| 3,977,489 A | 8/1976 | Cole et al. | | |
| 4,368,796 A * | 1/1983 | Patin | ............... | B60G 17/01925 180/215 |
| 4,498,015 A * | 2/1985 | Gottfried | ............... | B60L 11/16 290/1 A |

(Continued)

*Primary Examiner* — Paul N Dickson
*Assistant Examiner* — Timothy Wilhelm
(74) *Attorney, Agent, or Firm* — Eric D. Jorgenson, Esq.

(57) ABSTRACT

A rollover prevention architecture for a vehicle comprising a reactive force member mounted on the vehicle, the reactive force member controlled to generate a counter torque relative to the direction of sensed tipping or rollover to mitigate the tipping or rollover of the vehicle while the vehicle is moving.

20 Claims, 11 Drawing Sheets

(56) References Cited

U.S. PATENT DOCUMENTS

| | | | | |
|---|---|---|---|---|
| 4,691,798 | A * | 9/1987 | Engelbach | B62H 1/12 180/209 |
| 4,921,263 | A * | 5/1990 | Patin | B60G 21/007 280/124.103 |
| 4,974,863 | A * | 12/1990 | Patin | B62D 9/02 280/124.103 |
| 5,601,346 | A * | 2/1997 | Lustenberger | B60T 8/1755 303/141 |
| 6,332,104 | B1 * | 12/2001 | Brown | B60R 21/013 180/282 |
| 6,360,838 | B1 * | 3/2002 | Kulhavy | B62M 9/06 180/219 |
| 6,452,487 | B1 | 9/2002 | Krupinski | |
| 6,568,291 | B1 * | 5/2003 | Inman | B64G 1/28 244/165 |
| 6,834,218 | B2 * | 12/2004 | Meyers | B62D 6/00 701/1 |
| 6,938,716 | B1 | 9/2005 | Eull | |
| 6,938,924 | B2 | 9/2005 | Feldman et al. | |
| 6,976,432 | B2 * | 12/2005 | Jacob | B60F 1/04 105/72.2 |
| 7,468,592 | B2 * | 12/2008 | Lim | B25J 5/007 180/8.2 |
| 7,731,216 | B2 | 6/2010 | Cornish | |
| 7,959,164 | B2 * | 6/2011 | Keane | B60G 17/0162 280/124.106 |
| 8,214,107 | B2 * | 7/2012 | Sato | B60K 5/00 701/124 |
| 8,613,340 | B2 | 12/2013 | Hsu et al. | |
| 8,899,601 | B1 | 12/2014 | Mothfar | |
| 8,899,620 | B1 | 12/2014 | Bhardwaj et al. | |
| 8,935,048 | B2 | 1/2015 | Sun | |
| 8,973,450 | B2 * | 3/2015 | Suda | B61C 17/06 180/54.1 |
| 9,193,407 | B2 * | 11/2015 | Muth | B62J 99/00 |
| 2004/0061307 | A1 * | 4/2004 | Cole | B62D 53/0871 280/432 |
| 2007/0205578 | A1 | 9/2007 | Cornish | |
| 2008/0079237 | A1 * | 4/2008 | Rubin | B62D 53/0871 280/432 |
| 2009/0192674 | A1 * | 7/2009 | Simons | B60G 17/018 701/37 |
| 2009/0254251 | A1 * | 10/2009 | Sato | B60K 5/00 701/41 |
| 2010/0161168 | A1 | 6/2010 | Wu et al. | |
| 2011/0118944 | A1 * | 5/2011 | Tzipman | B60G 99/002 701/48 |
| 2012/0053788 | A1 * | 3/2012 | Amino | B60G 17/0165 701/37 |
| 2013/0274995 | A1 * | 10/2013 | Kim | B62D 37/06 701/36 |
| 2014/0058625 | A1 | 2/2014 | Sun | |
| 2015/0175224 | A1 * | 6/2015 | Carle | B62J 27/00 74/5.22 |

\* cited by examiner

COUNTER-TORQUE ROLLOVER PREVENTION ARCHITECTURE

CROSS-REFERENCE TO RELATED APPLICATIONS

This application claims the benefit of U.S. Provisional Patent application Ser. No. 62/008,928 entitled "COUNTER-TORQUE ROLLOVER PREVENTION ARCHITECTURE" and filed Jun. 6, 2014, the entirety of which is incorporated by reference herein.

BACKGROUND

Commercial trucking using tractor-trailer operators incur significant costs each year due to accidents that then result in repair costs, replacements costs, medical costs, and litigation. Many drivers die each year due to rollover accidents where, for whatever reasons, the trailer tips either left or right. In addition to the very high fatality rate of rollover accidents, massive repair costs are unavoidable. Moreover, the collateral impacts are also costly due to traffic pile-ups, traffic jams, lost product, lost productivity, and so on. Existing anti-rollover systems primarily use the vehicle anti-braking system, additional sensors, and the engine to recognize the rollover threat, and attempt to slow the vehicle before a rollover occurs. However, there still exist significant losses in the trucking industry and personal vehicle accidents due to loss of control and rollover accidents.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture comprises an electro-mechanical counter-torque rollover prevention system (CRPS) that enables the mitigation and/or prevention of loss of control and rollover of vehicles due to changes in surface road conditions, driver error, load movement (e.g., shifting loads such as liquids, livestock, etc.), and vehicle orientation (e.g., yaw experienced when hydroplaning on wet or slick surfaces, etc.). The architecture finds particular application to commerical cargo transports on roads and highways where changes in the route such as curves, road conditions (e.g., wet, icy, etc.), driver-introduced errors (e.g., over-correction), etc., may cause the center of gravity and changes in acceleration of the load (comprises any one or more of the trailer (or container), and product being transported) to shift to an unstable state thereby causing the trailer to begin to or completely tip over. This problem exists extensively with tractor-trailer cargo transports and single-frame trucks where the high center of gravity and acceleration vector of the load/trailer typically reach unstable states on the lateral (horizontal left or right) directions due to taking curve at an execessive speed or shifting load, for example.

The CRPS employs one or more reactive force (RF) (or rotational) members (e.g., a circular member similar to a flywheel, end-loaded beams, etc.) with sufficient mass, a drive and braking (DB) system for the one or more RF members, a monitor and control (MC) system, and a sensor system of sensors that interfaces to the MC system that enable monitor and control of the CRPS and sensing the static and dynamic conditions of the load.

An optimum counter torque is realized when the drive motor of the DB system applies torque to the non-moving RF member. Thereafter, if additional counter torque is desired in a short period of time following the previous "bump" in torque, the torque applied is against a rotating RF member. This situation can be addressed by applying an increased amount of torque than the previous bump in torque to the already rotating RF member to gain additional counter torque. As additional counter torque is desired and this process is repeated, the ability to gain additional amounts of counter torque is reduced since the RF member is rotating at ever higher speeds. However, this can be addressed when sizing the RF member for the particular applications, as described herein below.

An RF member can be designed according to needs of the particular application. The RF member is mounted such that rotation of the RF member is in the vertical plane to counteract rollover forces generally in the same plane. The axis of rotation of the RF member is perpendicular to the plane in which the RF member rotates and extends through the rotational center of the member in the direction of travel of the object to which the member is mounted. The RF member is controlled to rotate momentarily in a direction that produces counter torque to the tip direction as indicated by sensor data that indicates the cab, load, and/or trailer is tipping in an undesirable way. In other words, from the perspective of facing in the direction in which the vehicle is heading, if the load tips rightward, the CRPS operates to torque the RF member clockwise, which produces counter torque in the opposite direction to counter the tipping motion. Thus, the start-up torque provides the principal means to mitigate or counter any tipping or rollover rotation. For example, an RF member for a large trailer may be correspondingly larger in mass and dimensions than an RF member for a smaller trailer such as a mobile home or tow-behind trailer for a personal car.

The DB system can be any suitable components that enable the desired rotational response of the RF member in the time needed to counter the rotation in the tip direction. For example, the drive system can be an electric motor with sufficient horsepower and torque to accelerate the RF member in the desired time (e.g., a quarter turn in one second followed by one or more supplemental turns as needed for further stabilization). The drive system of the DB system can comprise any combination of mechanical elements such as gears, sprockets, belts, chains, pressure plates, etc., sufficient to enable rapid acceleration (counter torque) of the RF member when triggered to torque the RF member. The braking system of the DB system, when desired to be used, can include brake pads similar to what is used in automobiles and trucks to decelerate the RF member at the desired rate and lock (or block) the RF member when not needed. Other braking can be accomplished using the drive motor itself by electrically controlling the drive motor to decelerate, should decleration be desired.

The MC system can comprise a controller that executes software instructions in a hardware memory storage and/or memory cache to continually and/or periodically monitor the desired parameters, such as load speed (speed the vehicle is moving the load down the road), RF member state (e.g., activated or deactivated, rotational state, rotational speed for a partial turn, blocked/unblocked state, rotational acceleration rate, rotational deceleration rate, drive motor state, system temperature, etc.), geographical location information (e.g., heading, geographical location, etc.) of the load relative to a road condition (e.g., curve, dip, climb, icy, rainy, etc.), orientation of the load via orientation sensors such as accelerometers (e.g., single axis, tri-axis, etc.), tilt sensors, displacement sensors, and so on, power source parameters (e.g., charged, temperature, charging, low fuel, operating state, etc.), and other desired inputs.

The CRPS functions to operate the RF member that is mounted with the load (e.g., on the trailer housing the load or supporting the load) or tractor (e.g., on the rear of the cab, or on the frame behind the cab) to rapidly create an amount of counter-torque to the "tip-over" direction (rotation), forcing the load/cab in the opposite way in which the load/cab is tipping. The CRPS can be initiated by an "always active" sensor such as an accelerometer, for example, the readings from which are processed to cause activation of the drive motor to spin-up or partially turn the RF member in the desired rotation and time to create the torque counter to the direction of rollover. The CRPS counters human error by initiating/triggering automatically when data from a "tipping" sensor(s) (e.g., accelerometer) indicates a load tipping threat or possibility.

The CRPS architecture is particularly advantageous since tipping motion control is not reliant on any of the existing vehicle systems, but is a totally separate add-on to the vehicle. Thus, tipping motion control does not require that any or all of the tires be in contact with the road surface, whereas conventional systems use braking systems in one or more wheels, which rely on road contact to operate properly.

Disclosed herein in one implementation, is a rollover prevention system, comprising: a rotational member mounted in association with a vehicle, the rotational member having an axis of rotation in parallel with a heading of the vehicle, the rotational member mounted to enable rotation about the axis in a plane perpendicular to the heading of the vehicle, the rotational member having a mass such that when torque is applied to the rotational member, a counter torque is generated that mitigates a tipping motion of the vehicle; a drive system mechanically coupled to the rotational member to apply the torque to the rotational member according to a predetermined time duration; and a control system configured to control the drive system to apply the torque to the rotational member in response to a threshold triggered by an amount of the tipping motion.

Disclosed herein in an alternative implementation, is a rollover prevention system, comprising: a flywheel mounted on a transport vehicle, the flywheel having an axis of rotation in parallel with a heading of the transport vehicle, the flywheel rotates in a plane that approximates a direction of a tipping motion of the transport vehicle, the flywheel having a mass commensurate with a loaded weight of the transport vehicle such that when torque is applied to the flywheel, the tipping motion is mitigated; a drive system mechanically coupled to the flywheel to apply the torque to the flywheel according to a predetermined time duration; a sensor system deployed on the transport vehicle and configured to generate data that characterizes at least the tipping motion; and a control system configured to interface to the sensor system and control the drive system, the drive system controlled to apply the torque to the flywheel in response to an excessive amount of the tipping motion.

Disclosed herein in another implementation, is a rollover prevention method, comprising: mounting a reactive force member to a vehicle, the reactive force member having an axis of rotation in parallel with a heading of the vehicle and a plane of rotation in which the reactive force member rotates, the plane of rotation approximately parallel to a plane defined by lateral motion of the vehicle, the reactive force member having a mass commensurate with weight of the vehicle to cause a change in the lateral motion when the reactive force member is torqued; sensing lateral motion of the vehicle while the vehicle is traveling, the sensed lateral motion deemed excessive relative to a lateral motion threshold, which excessive lateral motion can cause loss of control of the vehicle; applying torque to the reactive force member for a predetermined time duration in response to the excessive lateral motion; checking for a reduction in the excessive lateral motion based on the applied torque; and recursively applying the torque and checking for the reduction in the excessive lateral motion until the excessive lateral motion is no longer excessive relative to the lateral motion threshold.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
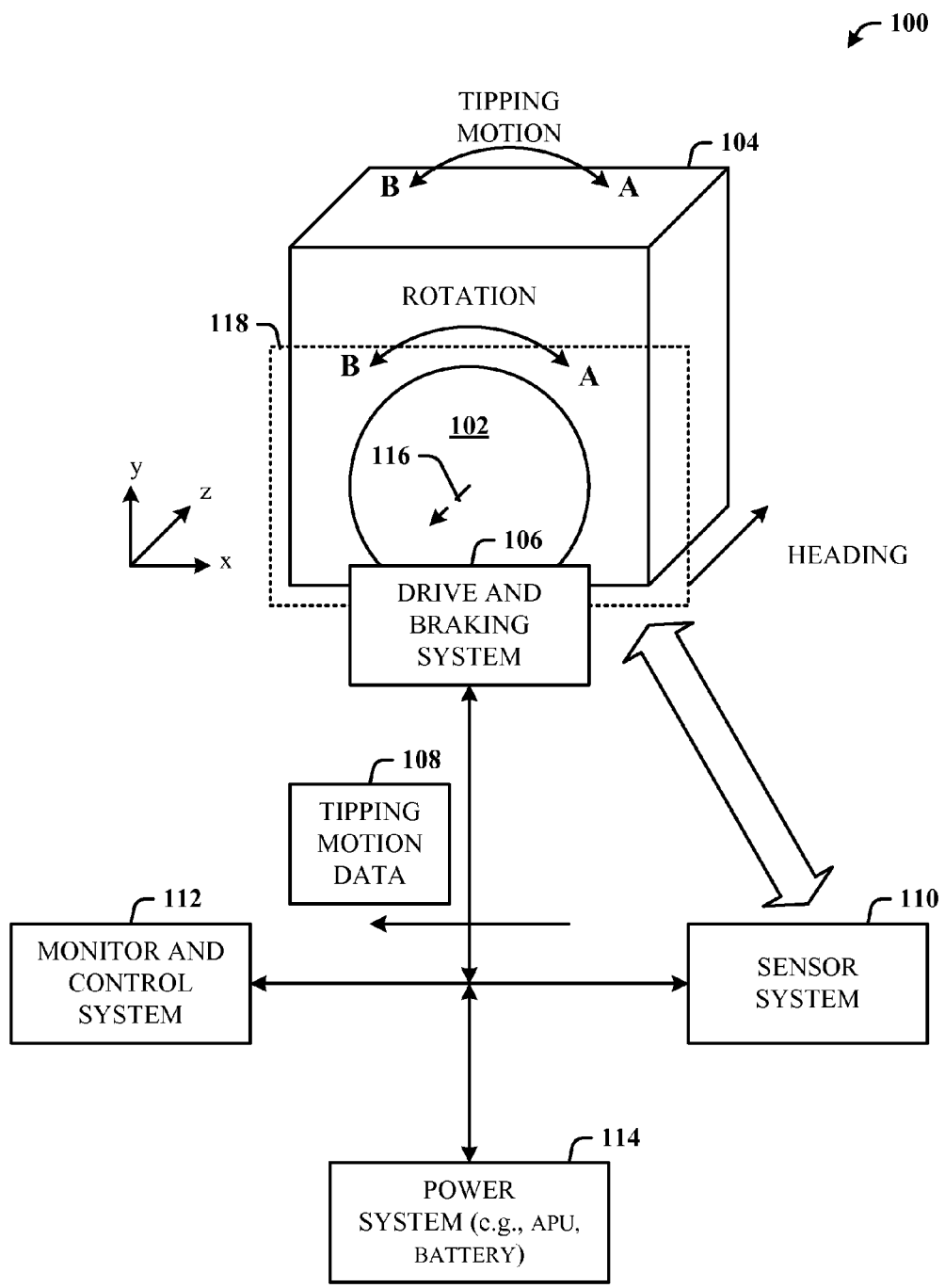
FIG. 1 illustrates a rollover prevention system in accordance with the disclosed architecture.

The disclosed architecture comprises an electro-mechanical counter-torque rollover prevention system (CRPS) that enables the mitigation and/or prevention of changes in surface or housing (load) orientation due to one or more undesirable directional forces. The architecture finds particular application to commerical cargo transports on highways where changes in the route such as curves, road conditions, driver introduced errors, etc., may cause the center of gravity and changes in acceleration of the load (comprises any one or more of the trailer (or container), and product being transported) to shift to an unstable state thereby causing the trailer to begin to or completely tip over. This problem exists extensively with tractor-trailer cargo transports where the high center of gravity and acceleration vector of the load/trailer typcially reach unstable states in the lateral (horizontal left or right) directions (e.g., perpendicular to the heading or forward moving direction) due to taking a curve at an execessive speed or rapid turning, for example.

The disclosed architecture finds applicability to many vehicle classifications, including, but not limited to, Federal Highway Administration vehicle types: 2-axle vehicles such as passenger cars, pickups, panel trucks, vans; 2-3 axle buses; single unit 2-axle trucks; single unit 3-axle trucks; single unit 4-axle or more trucks; single trailer 3- or 4-axle trucks; single trailer 5-axle trucks; single trailer 6-or-more-axle trucks; multi-trailer 5-or-less-axle trucks; multi-trailer 6-axle trucks; multi-trailer 7-or-more-axle trucks, and so on. This includes, but is not limited to, firetrucks, ambulances, tanker transports, buses, trains/train cars, and the like, as well as transports/trailers with potentially continually shifting loads, such as livestock (e.g., cattle, hogs, etc.) haulers, tankers that haul liquids, and horse trailers, for example.

Additionally, the disclosed architecture finds applicability in other areas where stable object orientation is desired. For example, highly sensitive material transport such as for nuclear fuels, hazardous materials, volatile chemicals, and so on, being transported within the truck trailer can be suspended/configured with its own CRPS system, while the truck system also has its own CRPS system for tilt management.

The CRPS does not need to rely on the vehicle braking system as a means of mitigating or preventing rollovers; however, in some implementations, the CRPS can be designed to electro-mechanically cooperate with vehicle braking systems.

The CRPS employs one or more reactive force (RF) members, a drive and braking (DB) system for the one or more RF members, a monitor and control (MC) system, and a sensor system of one or more sensors that interfaces to the MC system, which enables monitor and control of the CRPS and sensing of the static and dynamic conditions of the load.

An RF member can be designed according to the particular application. The RF member is also referred to as a flywheel herein; however, in this description, the flywheel is not necessarily accelerated to a full rotational velocity, but only a partial turn or rotation, as desired, so as to be able to obtain the most counter torque from a stationary state of the flywheel. An RF member for a large (heavy) trailer may be correspondingly larger in mass and dimensions than an RF member for a smaller (less weight) mobile home or tow-behind trailer for a personal car.

The DB system can be any suitable components that enable the desired rotational torque of the RF member and if braking is desired, braking of the RF member in either direction, depending on the particular direction of rollover. For example, the drive system can be an electric motor with sufficient horsepower and torque to accelerate ("torque") the RF member to output the desired directional counter torque in the desired time (e.g., a partial turn in a fraction of a second, a single revolution in two seconds, etc.). The braking system can include brake pads and/or clutch braking systems similar to what is used with automobiles and trucks to decelerate the flywheel at the desired rate and lock (or block) when the RF member is not needed.

The MC system can comprise a controller that executes software instructions in a hardware memory storage to continually and/or periodically monitor the desired parameters, such as load speed (speed the vehicle is moving the load down the road), RF member state (e.g., idle (no rotation at all), pulsed rotational speed, blocked/unblocked state, rotational acceleration rate, rotational deceleration rate, drive motor state, system temperature, etc.), geographical location information of the load relative to a road condition (e.g., curve, dip, grade, climb, icy, slick, rainy, etc.), orientation of the load via orientation sensors such as accelerometers (e.g., single axis, tri-axis, etc.), tilt sensors, displacement sensors, load cells, strain gauges, and so on, power source parameters (e.g., charged, temperature, charging, low fuel, operating state, etc.), and other desired inputs.

In one implementation, the CRPS functions to operate a single RF member that is mounted in a housing and with the load (e.g., on the trailer housing or frame in which the load is supported for hauling) to rapidly create an amount of torque counter to the "tip-over" direction (rotation), thereby introducing a force that is counter to the direction in which the load is tipping. The CRPS can be initiated by an "always active" accelerometer(s), for example, the readings from which are processed to cause activation of the drive motor to rotate the flywheel briefly (e.g., partial turn) in the desire time to create the sufficient counter-torque to counter the rotation of the trailer (or load). The CRPS counters human error by initiating automatically when data from a "tipping" sensor(s) (e.g., single axial, bi-axial, and/or tri-axial accelerometers) indicates a load-tipping threat or possibility thereof.

In another implementation, the CRPS functions to operate a single RF member that is mounted in a housing and on the tractor (e.g., on the tractor cab in which the driver is located) in a separable tractor-trailer "rig". Thus, rather than the expense of providing the CRPS for each trailer, the CRPS stays with the tractor. In this case, the mechanical connection between the tractor and the trailer is sufficiently rigid and strong to enable the rapid creation and transfer of an amount of torque counter to the "tip-over" direction (rotation), thereby introducing a force that is counter to the load in the direction substantially opposite to the direction in which the load is tipping. The CRPS can be initiated by an "always active" accelerometer, for example, the readings from which are processed to cause activation of the drive motor spin-up of the flywheel in the desire time to create the counter-torque. The CRPS counters any instability that may have been caused by human error by initiating automatically when data from a "tipping" sensor (e.g., accelerometer) indicates a load tipping threat or possibility.

The following description, although specific to a typical commercial tractor-trailer transport vehicle configuration, is not to be construed as limited to such. For example, a single-frame truck on which the cab and the container (in which the load is secured) or a flatbed (on which the load is secured) are mounted to the same frame, can also benefit from the CRPS.

The CRPS initiates spin-up of the RF member in the direction needed until the counter torque generated meets the desired criteria. For example, if the trailer is moving into a right-handed curve in the road and begins tipping to the left while moving around the right-hand curve, then the RF member is momentarily rotated ("torqued") counterclockwise (as viewed in the direction the trailer is heading), creating sufficient counter-torque to neutralize or reduce the leftward tipping force and enable tip of the trailer back to the right. Since the drive motor can be mounted to the trailer, when the drive motor torques the RF member to the left (counterclockwise), the motor and trailer will be forced rotationally to the right. From another perspective, while standing in front of the vehicle and looking at the front of the vehicle, if the trailer tips rightward, the RF member is torqued to turn clockwise so that a counter-torque is generated the counters the rightward tip motion of the trailer to bring the trailer back leftward.

In a more specific exemplary implementation, the CRPS employs an accelerometer, an electric starter motor (e.g., capable of three hundred amps cranking power, one hundred fifty horsepower), and an RF member (e.g., a circular member that approximates a seven foot diameter, four inches thick, with a carbon steel outer rim). The CRPS utilizes the accelerometer to detect when the trailer is tipping beyond a predetermined tip threshold. The MC system processes the accelerometer data to assess that tip has exceeded or is trending to exceed the tip threshold, and then initiates the electric motor. The electric motor can be securely mounted to/in a housing, which housing is mounted to the outside (forward-facing vertical side) of the trailer (near the tractor cab) so as to not consume any interior storage space of the trailer.

When initiated, the electric motor drives (torques) the RF member in an appropriate direction and within a defined time span. The RF member is constructed to employ most of its weight on the outer edge perimeter, thereby providing greater counter-torque relative to the tipping. The RF member can be constructed of low grade solid carbon steel, and mounted on an outside wall of the trailer in a suitable housing or an inside forward wall (e.g., the wall near the tractor cabin) in a suitable housing.

The CRPS can be powered by an auxiliary power unit (APU) of the tractor-trailer vehicle to always have ready access to a power source and to be always (continually) active when the tractor-trailer is in operation. Alternatively, the CRPS can use the vehicle battery system if the battery system is of a suitable power output design. The CRPS can be deployed to only use energy when preventing a rollover; otherwise, the MC system actively monitors the one or more accelerometers (sensors) for receipt of accelerometer data that when processed, indicates tipping is likely or predicted to occur.

In one implementation, the CRPS is sufficiently lightweight (e.g., one thousand pounds) to not overly impact the maximum allowable load weight for various classes of commercial trucks and other vehicle types.

As previously indicated, the CRPS system can be mounted on a trailer, at the end near the trailer hookup (e.g., the fifth wheel), between the tractor and the trailer, and either inside or outside of the trailer. If multiple RF members are employed, the control system can utilize a single controller (e.g., a Raspberry Pi™) or multiple intercommunicating respective controllers working together to control RF member rotation using rollover motion sensors (e.g., accelerometers), and/or data acquisition system using one or more programming language/algorithms.

It can be the case that the controller interpolates the tipping motion data to determine if the RF member needs to be activated at all. For example, if the tipping motion data indicates that although the trailer motion is likely indicating tipping, yet the projected motion indicates the tipping threshold will not be met, then the RF member does not need to be torqued.

In another example, it may be the case that interpolation indicates that the RF member only needs to be torqued at a lesser startup power instead of full power startup to counter a projected tip. In other words, the amount of power applied to the drive motor can be designed and configured to relate directly to the amount of torque generated at any moment in time (e.g., higher power equates to higher torque; lower power equates to lower torque). Thus, rather than driving the motor at full power when turned on and using a predetermined time duration to determine when to apply the counter-torque ("bump the flywheel"), the input power can be controlled to "regulate" the amount of counter torque desired. These alternative implementations enable more granular control such as may be desired when hauling products (e.g., eggs, volatile fluids, etc.) that may be more sensitive to sideways motion/rotation.

It can also be the case that the CRPS employs or communicates with a geo-tracking system such as global positioning system (GPS) such that roads and routes of travel can be readily identified that are commonly known to include curves, road obstructions, etc., and hence, the CRPS can be activated to a predetermined state in anticipation of approaching the known route conditions such as curves, a "high-incident of rollover" curve, etc.

The power source can be batteries and/or obtained from an auxiliary fuel driven generator dedicated for the CRPS, an auxiliary power unit of the truck/vehicle, or any combination of thereof.

The CRPS can be calibrated to the typical orientation of the trailer or container for which it is being used, which is typically a vertical orientation of the trailer and thus, a vertical orientation (axis of rotation is horizontal (spin is in the vertical plane) in the direction the load is heading) of the RF member; however, other implementations may utilize the CRPS RF member in a horizontal orientation (axis of rotation is vertical and spin in the horizontal plane). This latter implementation can be employed to counter yaw (a change in the heading direction of a trailer of a tractor-trailer rig) in the horizontal plane. Such yaw changes are encountered when the trailer or single-frame vehicle slips/slides sideways due to ice or hydroplaning on the road.

In one implementation, the drive system can be controlled using a drive system that operates to gradually increase the torque instances based on the current rotation of the RF member. For example, the first instance of counter torque by the CRPS will typically be the largest amount of torque. Since the flywheel may be in motion, any subsequent measure of counter torque is based on the current rotational speed of the flywheel. Thus, if subsequent "bumps" of incremental instances of counter torque are needed, the drive motor will need to be engaged (pulsed) at full power for longer time durations for each instance. Once the flywheel reaches full rotational speed, if at all, the ability to obtain counter torque is minimized, if not outright impossible. Thus, once bumped to get the desired counter torque, the flywheel is no longer engaged to active rotation, but enabled to wind down until the next instance of bump, if needed at all. Thus, the next instance of torque bump is based on the existing rotational speed of the flywheel.

The sensing system can be used to determine when the CRPS system enters modes of operation, such as a standby (warm up) mode in anticipation of rotational acceleration of RF member and when the CRPS can shut down entirely. Other data that can be processed include the vehicle speed such that the RF member can be activated based on tipping motion data and speed of the vehicle.

The CRPS system can also be employed in non-commercial vehicles such as personal cars, other commercial and non-commercial truck types such as box or straight trucks, etc. In more general applications, the CRPS system can be used to stabilize structures from external rotational forces.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a rollover prevention system 100 in accordance with the disclosed architecture. The system 100 can include an RF member 102 applied to a container 104 (e.g., a trailer, a single-frame truck with box container mounted on a flatbed trailer, etc.) that when operated prevents the container 104 from tipping over in the general direction(s) of the tipping motion or at least delays the tipping motion sufficiently to give a person time to react to assist in countering the total rollover of the container 104.

The RF member 102 can be driven (e.g., rotated, momentarily bumped, braked, and blocked) by a drive and braking (DB) system 106 in response to detection of a tipping motion (generally in leftward and rightward directions and perpendicular the heading (forward motion), and denoted as "Tipping Motion") based on tipping motion data 108 generated by and received from a sensor system 110. The tipping motion data 108 can be raw data from sensors of the sensor system 110 such that a monitor and control (MC) system 112 receives and processes the raw sensor data to determine if the tipping motion is sufficient for a rollover, as computed based on some threshold. Alternatively, the sensor system 110 processes the raw sensor data to determine if the sensor data as computed is the tipping motion data 108.

In response to the acquisition of the tipping motion data 108, the MC system 112 controls the drive subsystem of the DB system 106 to apply counter torque to the free-wheeling RF member 102 in the appropriate direction of rotation to produce torque counter to the tipping motion, thereby preventing rollover of the container 104. For example, if the tipping motion of the container 104 is in the clockwise or A direction, the counter torque applied by the DB system 106 results in rotation at the top of the RF member 102, in the same direction, direction A. Similarly, if the tipping motion of the container 104 is in the counterclockwise or B direction, the counter torque applied by the DB system 106 results in rotation at the top of the RF member 102, in the same counterclockwise direction, direction B. A power system 114 provides power to the MC system 112, the sensor system 110 and, drive and braking system 106.

Once the initial instance of counter torque is generated, for a predetermined time duration (e.g., milliseconds, seconds, etc.), the MC system 112 makes a quick assessment as to the state of the current tipping motion. If the tipping motion is not being abated as quickly as desired, or not abated at all, as compared to precomputed data or function(s) used to determine if the tipping threshold data is sufficient to trigger (e.g., equal to or exceeds) the tipping threshold, a second instance of counter torque can be generated and applied (e.g., the drive motor pulsed) to the RF member 102, and the overall state of the tipping motion then reassessed. This process continues until the data indicates the tipping motion is "under control" (e.g., below the threshold), at least in the one direction.

It can be the case that the correction of the tipping motion in the original direction results in tipping motion in the direction opposite to the original tipping motion (rocking back and forth, side to side). In this case, the RF member 102 is then torqued in the opposite rotation to counter the opposite tipping motion, and processed as described above recursively until the opposite tipping motion is deemed to be acceptable.

As shown, the RF member 102 rotates in the x-y plane (as shown by the x-y-z axis), while the axis of rotation 116 of the RF member 102 is approximately parallel to the z-axis, which approximates the direction the load/vehicle is heading.

Put another way, a rollover prevention system is provided, comprising a rotational member (referred to herein as also a flywheel and a reactive force member) mounted in association with a vehicle (e.g., truck, van, personal vehicle, transports, etc.). The rotational member has an axis of rotation (similar to axis of rotation 116) in parallel with a heading (Heading) of the vehicle. The rotational member is mounted to enable rotation of the rotational member about the axis of rotation 116 in a plane 118 perpendicular to the heading of the vehicle (and container 104).

The rotational member is constructed to have a mass and dimensions such that when torque is applied to the rotational member, and a counter torque is generated that is sufficient to bump (torque) the rotational member provide mitigation to a tipping motion of the vehicle. The counter torque and dimensions of the rotational member, such as a flywheel (e.g., a rimmed flywheel, which has a rim, a hub, and spokes), can be calculated using the following relationship:

$$I=0.5M(R_1^2+R_2^2)$$

where I is the moment of inertia (e.g., kilogram-meter squared (kgm$^2$) and the counter torque force the CRPS creates to counter the tipping motion); M is the mass of the flywheel (e.g., 450 kilograms weighted predominantly on the rim of the flywheel); $R_1$ is the radius (in meters) from the center of the flywheel to the inside edge of the rim portion; and, $R_2$ is the radius (in meters) from the center of the flywheel to the outside edge of the rim portion. The moment of inertia is the measure of resistance to torque as applied to a spinning object. Thus, a flywheel weighing 450 kg, and inside radius $R_1$=37 inches (0.94 m), and outside radius $R_2$=40 inches (approximately 1.0 m), calculates to I=421 kgm$^2$ of counter torque generated. Using this relationship, and computing the counter torque desired, the drive motor can then be sized to output the counter torque.

A drive system (similar to or the drive part of the drive and braking system 106) is provided and mechanically coupled (e.g., via gears, chains, shafts, etc.) to the rotational member to apply the torque to the rotational member according to a predetermined time duration.

A control system (similar to the MC system 112) is provided and configured to control the drive system to apply the torque to the rotational member in response to a threshold triggered by an amount of the tipping motion. The threshold can be determined specifically for the type of vehicle, which may differ from a tractor-trailer to a personal van, for example. The threshold can be a tilt angle (defined as the angular deviation from the y-axis or the x-axis) or a yaw angle (for side-to-side motion and defined as the angular deviation from the z-axis).

The system can further comprise the sensor system 110 in communication with the control system. The sensor system 110 can be deployed on the vehicle (e.g., the driver section, the load section, or both sections) and configured to generate data that characterizes the tipping motion. The sensors can include, but are not limited to, accelerometers, tilt meters, displacement sensors, sonic sensors, laser sensors, load cells, strain gauges, temperature sensors, humidity sensors, pressure sensors, and so on.

The system can further comprise a power system (e.g., batteries, charger, power converter, etc.) configured to supply power to the drive system, the control system, and the sensor system. The power system 114 can be mounted inside or outside of a housing that structurally supports the rotational member. The housing is designed to mechanically align and couple the systems to enable the suitable amounts of torque to be applied without impacting structural integrity of the housing. For example, the housing can be a constructed of aluminum or steel, and bolted to the appropriate cab, frame, or trailer of the specific vehicle type. In one implementation, the housing can be designed to swivel under computer control in order to approximately match the plane in which the lateral motion is detected. This capability enables an optimized application of the counter torque to the lateral motion.

The power system and the drive system can be mounted on the rotational member, and rotate with the rotational member. As described herein, one or both of these systems can be mounted on the outer rim of the rotational member and spaced along the rim to provide a balanced distribution of weight on the rotational member.

The control system controls the drive system to apply multiple separate instances of torque to the rotational member based on state of the tipping motion. That is, successive and distinct applications of torque with correspondingly shorter or longer durations of time can be applied to mitigate the lateral motion or tipping motion until the excessiveness of the motions is reduced or mitigated.

The control system regulates the torque applied to the rotational member based on at least one of time duration of the applied torque or variable power applied to the drive system. In other words, it is possible to incorporate a power control component that enable selective control of the power applied to the drive system such that a lower applied power translates to a correspondingly lower torque and a higher applied power translates to a correspondingly higher torque.

The rotational member, drive system, and control system can be mounted on a tractor of a tractor-trailer vehicle, sense the tipping motion in the trailer, and apply counter torque to the tractor to mitigate the tipping motion of the trailer. Alternatively, the rotational member, drive system, and control system can be mounted on a trailer of a tractor-trailer vehicle, sense the tipping motion in the trailer, and apply counter torque to the trailer to mitigate the tipping motion of the trailer.

An alternative rollover prevention system, can comprise: a flywheel mounted on a transport vehicle, the flywheel having an axis of rotation in parallel with a heading of the transport vehicle, the flywheel rotates in a plane that approximates a direction of a tipping motion of the transport vehicle, the flywheel having a mass commensurate with a loaded weight of the transport vehicle such that when torque is applied to the flywheel, the tipping motion is mitigated; a drive system mechanically coupled to the flywheel to apply the torque to the flywheel according to a predetermined time duration; a sensor system deployed on the transport vehicle and configured to generate data that characterizes at least the tipping motion; and a control system configured to interface to the sensor system and control the drive system, the drive system controlled to apply the torque to the flywheel in response to an excessive amount of the tipping motion.

The system can further comprise a power system configured to supply power to the drive system and the control system and the sensor system, wherein the power system is a transport vehicle power system or an auxiliary power system that provides power only to the rollover protection system.

The flywheel, the drive system, the power system, and the control system can be structurally mounted in a single housing and, mechanically and electrically coupled for standalone operation, the housing securable to the transport vehicle. The control system controls the drive system to apply multiple separate instances of torque to the flywheel to mitigate the tipping motion. The control system regulates time duration of the torque applied to the flywheel based on data that characterizes effectiveness of the applied torque to mitigate the tipping motion.

The transport vehicle comprises a load section via which a load is secured for transport and a driver section that facilitates the transport of the load, the flywheel mounted with the load section or with the driver section, the flywheel torqued to counter the excessive amount of tipping motion. The drive system mechanically couples to the flywheel by one of directly via a drive shaft of the drive system, via a gear drive system, via a chain drive system, via a belt drive system, or via a pressure plate friction system, or any other commonly-known mechanical techniques. The sensor system comprises a tipping motion sensor that enables sensing of the tipping motion, the tipping motion sensor located on a king pin of the transport vehicle.

Figure 2:
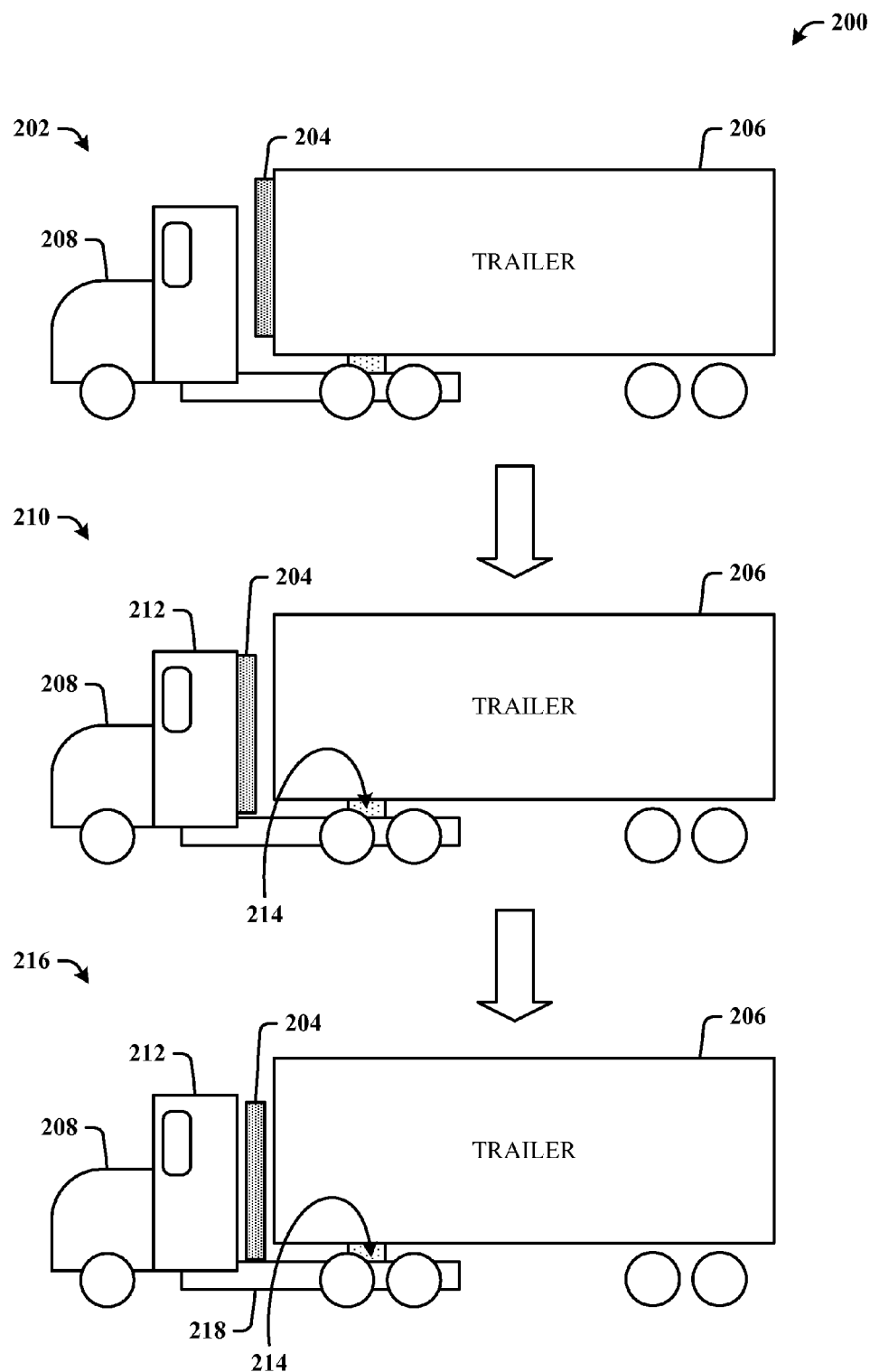
FIG. 2 illustrates a set of different locations for an implementation of the CRPS for a tractor-trailer system.

FIG. 2 illustrates a set of different locations 200 for an implementation of the CRPS for a tractor-trailer system. In a first implementation 202, the CRPS is located inside a housing 204 that mounts to an outside (forward-facing to the heading direction) wall of a trailer 206 between a tractor 208 and the trailer 206. In this first implementation 202, the CRPS in the housing 204 can be configured (connected) to draw power from the tractor power system(s) (e.g., battery system, power generation systems, etc.) through the umbilical conduit (not shown) that normally extends from the tractor 208 to the trailer 206 to provide power to lights and other power consuming elements of the trailer 206. Optionally, the CRPS located in the housing 204 can be completely power self-sufficient, thereby not requiring any power from external systems. Thus, power sources (renewable, such as batteries) are included inside the housing 204. Additionally, when the CRPS detects the trailer 206 having excessive tilt motion laterally (a direction into or out of the page), the CRPS torques the RF member to counter the tilt motion (rotation) of the trailer 206.

In a second implementation 210, the housing 204 is mounted on the backside of a cab 212 of the tractor 208. As before, the CRPS in the housing 204 can be configured (connected) to draw power from the tractor power system(s) (e.g., battery system, power generation systems, etc.) through the umbilical conduit (not shown) that normally extends from the tractor 208 to the trailer 206 to provide power to lights and other power consuming elements of the trailer 206, or a different electrical conduit suitable for the desired purposes. Optionally, the CRPS located in the housing 204 can be completely power self-sufficient, thereby not requiring any power from external systems. Thus, power sources (renewable, such as batteries) are included inside the housing 204.

Additionally, when the CRPS detects the trailer 206 and/or the tractor 208 having excessive tilt motion laterally (a direction into or out of the page), the CRPS torques the RF member to counter the tilt motion (rotation) of the tractor 208, which when employing a suitable structural rigidity between the tractor 208 and the trailer 206, also counters the rotation of the trailer 206. The structural rigidity is obtained by way of a "fifth wheel" configuration 214 (comprising a kingpin (a steel pin fixed to the trailer 206) and a coupling device mounted on the tractor 208 (in which the kingpin is captured)). Once fully engaged, the rotational aspects of the trailer 206 relative to the tractor 208 is restricted, thereby enabling counter torque applied to the tractor 208 to be transferred to the trailer 206, as well.

In a third implementation 216, the housing 204 is mounted on a frame 218 of the tractor 208, between the tractor 208 and the trailer 206. As before, the CRPS in the housing 204 can be configured (connected) to draw power from the tractor power system(s) (e.g., battery system, power generation systems, etc.) through the umbilical conduit (not shown) that normally extends from the tractor 208 to the trailer 206 to provide power to lights and other power consuming elements of the trailer 206, or a different electrical conduit suitable for the desired purposes. Optionally, the CRPS located in the housing 204 can be completely power self-sufficient, thereby not requiring any power from external systems. Thus, power sources (renewable, such as batteries) are included inside the housing 204.

Additionally, when the CRPS detects the trailer 206 and/or the tractor 208 having excessive tilt motion laterally (a direction into or out of the page), the CRPS torques the RF member to counter the tilt motion (rotation) of the tractor 208, which when employing a suitable structural rigidity between the tractor 208 and the trailer 206, also counters the rotation of the trailer 206. The structural rigidity is obtained by way of the "fifth wheel" configuration 214 (comprising the kingpin (the steel pin fixed to the trailer 206) and the coupling device mounted on the tractor 208 (in which the kingpin is captured)). Once fully engaged, the rotational aspects of the trailer 206 relative to the tractor 208 are restricted, thereby enabling counter torque applied to the tractor 208 to be transferred to the trailer 206, as well.

Following are a set of alternative implementations of the RF member and the DB system 106. These implementations can include chain, belt, and gear arrangements, as well as stand-alone CRPS systems. It is to be appreciated that these are only a few of the implementation that can be employed to mechanically couple to and drive the RF (rotating) member in accordance with the disclosed architecture, and that other suitable configurations could also be employed.

Figure 3:
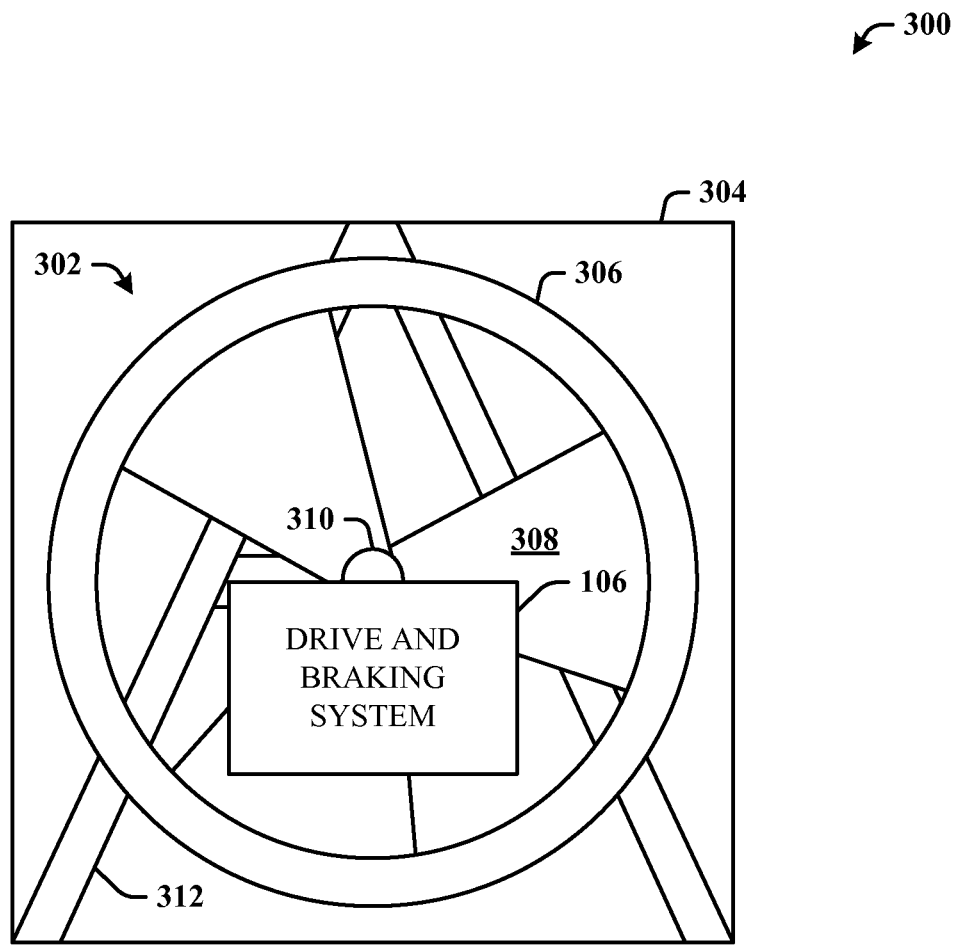
FIG. 3 illustrates an exemplary RF member system for operation with the drive and braking system.

FIG. 3 illustrates an exemplary RF member system 300 for operation with the drive and braking system 106. The RF member system 300 comprises an RF member 302 (similar to RF member 102) inside a housing 304 (similar to housing 204). The RF member 302 can be implemented as an inertia wheel having an outer rim 306 of sufficient mass (in combination with the mass of spokes 308 that anchor the outer rim 306 to a shaft 310 (and hub) relative to the installation (type of vehicle, weight of vehicle, etc.) such that torque applied to the RF member 302 generates a counter torque sufficient to impact (counteract) the tipping motion experienced by the vehicle to which the system 300 is mounted.

In this example implementation, the RF member 302 is mounted on an A-frame structure 312, which A-frame structure is securely affixed to the inside of the housing 304 to enable the housing 304 to protect the RF member 302 and any other systems located therein from environment elements such as rain, dust, moisture, etc., and also to prevent injuries to users while in operation. In the example implementation, the DB system 106 is mounted to enable direct-drive coupling of a drive motor shaft to the shaft 310.

Figure 4:
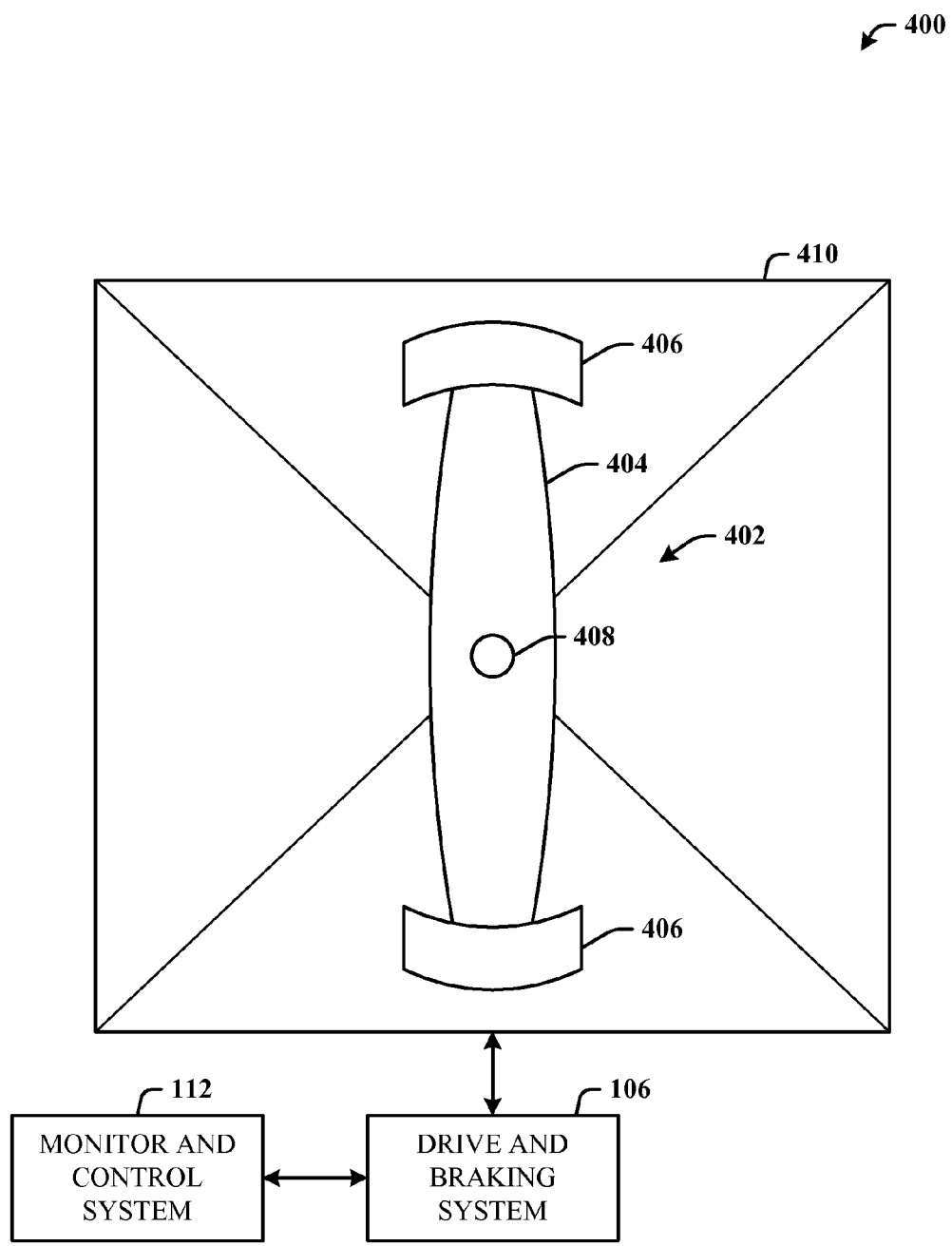
FIG. 4 illustrates an exemplary RF member system for operation with the drive and braking system and MC system.

FIG. 4 illustrates an exemplary RF member system 400 for operation with the drive and braking system 106 and MC system 112. Although the disclosed CRPS has been shown as using a wheel-type RF member 302 in FIG. 3, it is within contemplation of the disclosed architecture that other suitable designs for the RF member can be employed. For example, rather than a wheel shape, an RF member 402 can be in the shape of a double-ended pendulum, having a central support member 404 and heads 406 of suitable mass on each end of the support member 404, and where the point of rotation 408 is at the center of the support member 404.

A housing 410 (similar to housing 202) can internalize the RF member 402 from weather and other adverse conditions, as well as provide safety from injury and catastrophic failure due to vehicle crashes or other such failures or impacts. The housing 410 can also enclose any gears and gearboxes that facilitate the rapid acceleration of the RF member 402 in the desired direction.

Figure 5:
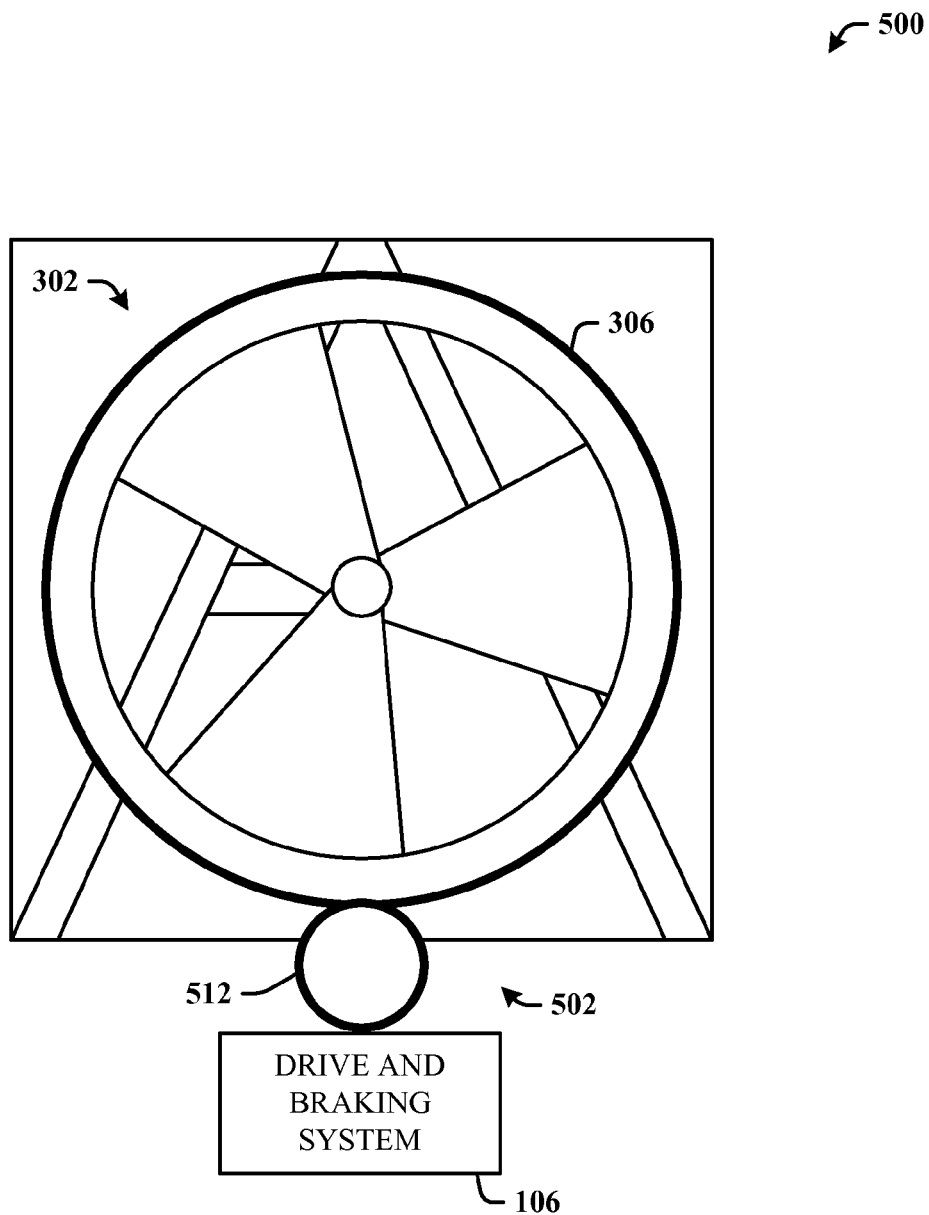
FIG. 5 illustrates an exemplary drive system for operation with the drive and braking system that employs a gear drive system.

FIG. 5 illustrates an exemplary drive system 500 for operation with the drive and braking system 106 that employs a gear drive system. In this system 500, the outer rim 306 is designed with gear teeth (represented as a thick black line on the outside of the outer rim 306) that engage a sprocket 512 driven by the DB system 106.

Figure 6:
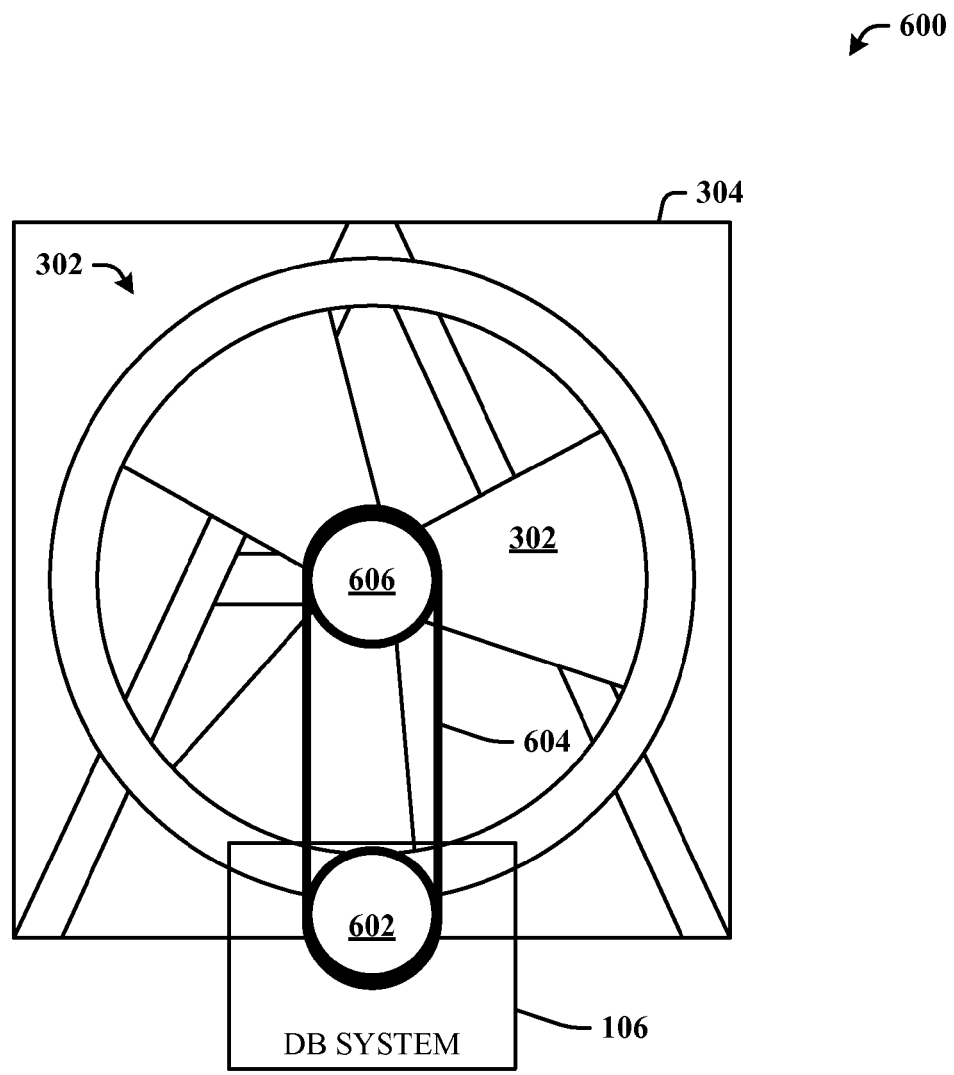
FIG. 6 illustrates an exemplary drive system for operation with the drive and braking system that employs a chain/gear drive system.

FIG. 6 illustrates an exemplary drive system 600 for operation with the drive and braking system 106 that employs a chain/gear drive system. Here, the DB system 106 employs a sprocket 602 coupled to the drive shaft of the drive motor, and a chain 604 coupled from the drive motor sprocket 602 to a sprocket 606 locked onto the shaft 310 (shown in FIG. 3) of the RF member 302.

Figure 7:
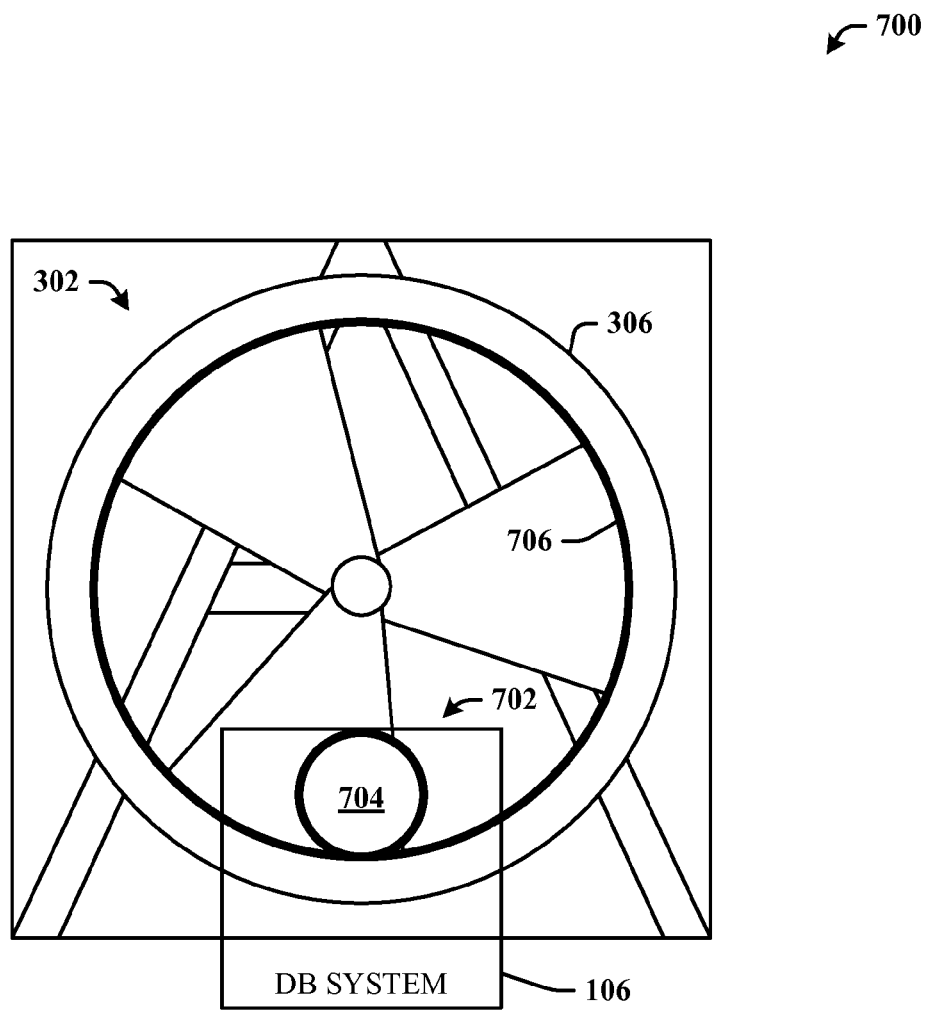
FIG. 7 illustrates an exemplary drive system for operation with the drive and braking system that employs a purely gear driven system.

FIG. 7 illustrates an exemplary drive system 700 for operation with the drive and braking system 106 that employs a purely gear driven system 702. Here, the DB system 106 employs a gear 704 coupled to the drive shaft (not shown) of the drive motor (not shown). Here, the RF member 302 is constructed with teeth 706 (represented as a thick black line on the inside of the outer rim 306), the teeth 706 engaged by the gear 704 coupled to the drive motor.

Figure 8:
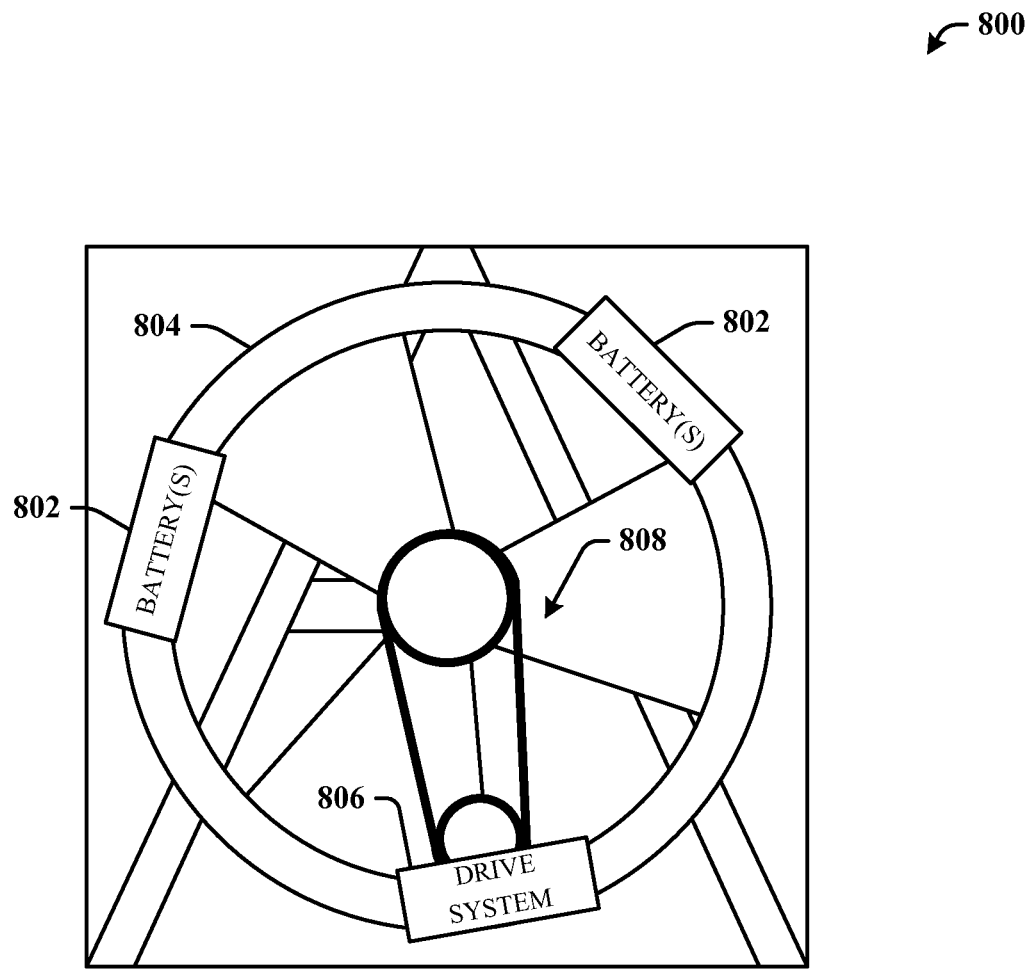
FIG. 8 illustrates yet another exemplary drive system for operation with the drive and braking system that employs member-mounted components.

FIG. 8 illustrates yet another exemplary drive system 800 for operation with the drive and braking system 106 that employs member-mounted components. Here, the power source (a set of batteries 802) that is mounted on the rotating member 804, as well as a drive system 806 mounted on the rotating member. The drive system 806, and battery sets 802 are distributed equally on the rotating member 804 for balanced rotation when torque is applied. The drive system 806 drives a chain/sprocket (gear) assembly 808 to apply torque to the rotating member 804.

Although not shown, in yet another drive implementation, a centrifugal clutch system can be employed or a clutch/pressure plate assembly commonly used in vehicles.

It is to be understood that the RF member (e.g., 102 and 402) is not intended to be continuously spinning such as with a flywheel. The RF (rotating) member is intended to be rotated a partial turn such as a half-turn, quarter turn, etc., sufficient to counter the tip forces. It can be the case, that multiple rotations (e.g., uni-directional, bi-directional, etc.) are implemented to stabilize the load (trailer). For example, if an initial three-quarter rotation is deemed to be insufficient to counter the tip vector, the MC system may compute that a follow-up quarter turn may then bring stability to the trailer, and hence, execute the supplemental quarter turn rotation. In other words, the architecture is sufficiently robust to detect and activate a series of RF member rotations as needed.

Additionally, in more complex implementations, the architecture may employ multiple RF member systems under control of a single or multiple MC systems. For example, a tractor can pull multiple trailers, in which case the RF members of each trailer are connected to the MC system of the lead trailer through the trailer "umbilical cords". Thus, the RF member and MC system of a first trailer can be controlled to operate independently of the RF member and MC system of a second trailer, and so on.

In yet another implementation, the architecture finds application to flatbed trailer systems where shipping containers are locked down thereto for transport. The shipping container can then be fitted with the CRPS system for over-the-road transport and tip prevention.

In still another implementation, the architecture finds application to side-loading containers or trailer systems such as rail cars, for example. In this case, it may be desirable to fit the container/trailer with two CRPS systems: two RF members with a single member at each end, drive and braking systems, one or two sensor systems, one or two power systems, and a single MC system for both trailer-mounted RF members. In this way, heavier loads with larger tip vectors can be counter-torqued using multiple RF member systems. The MC system then coordinates the independent rotations of the RF members, as needed.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A rollover prevention method is provided in accordance with the disclosed architecture. An RF member is mounted to a trailer. The RF member is controlled to rotate the RF member in a direction that promotes torque counter to a rollover direction of the trailer to prevent the trailer from rolling over as the trailer is moving.

Figure 9:
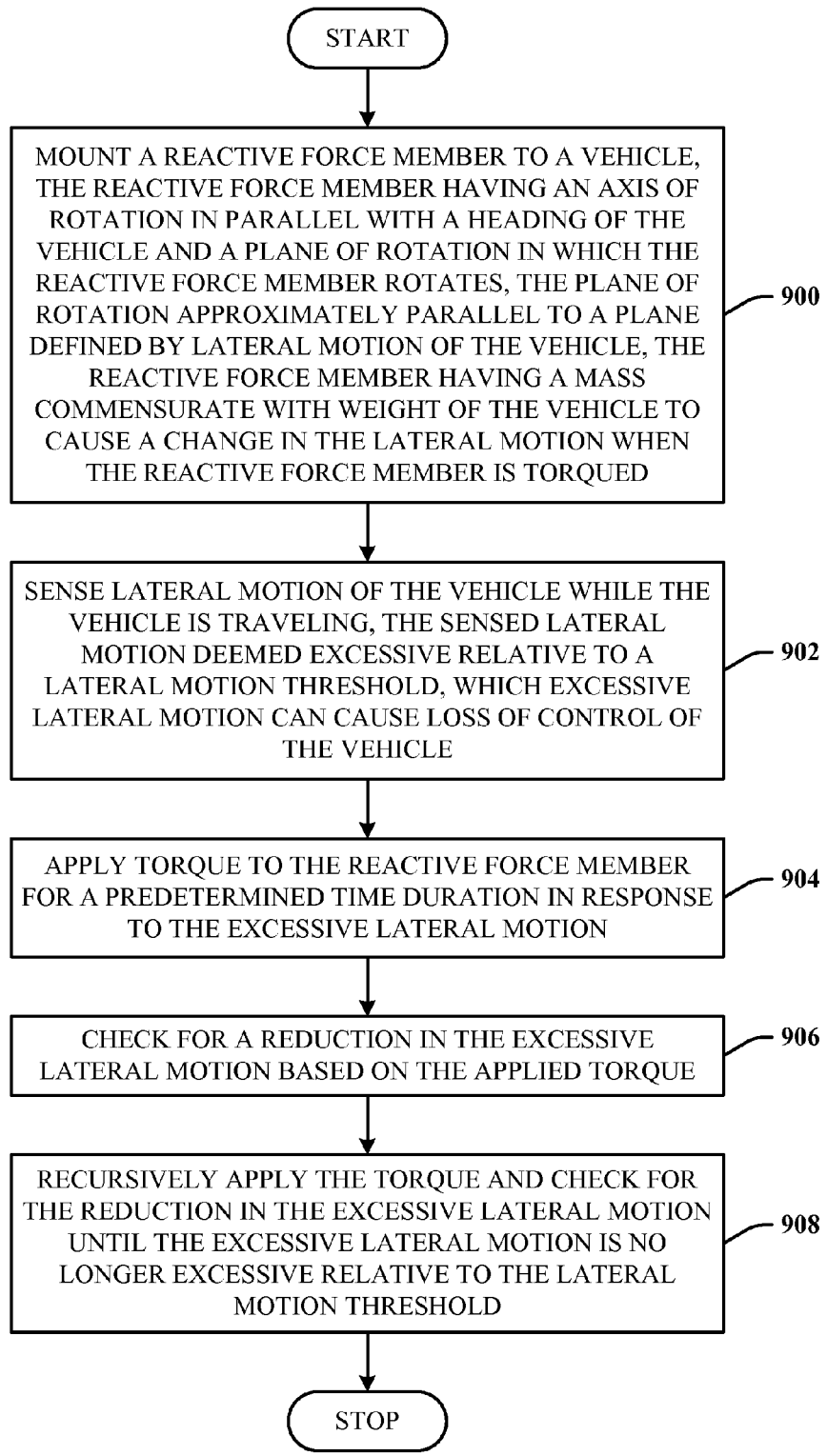
FIG. 9 illustrates a rollover prevention method in accordance with the disclosed architecture.

FIG. 9 illustrates a rollover prevention method in accordance with the disclosed architecture. At 900, a reactive force member is mounted to a vehicle. The reactive force member has an axis of rotation in parallel with a heading of the vehicle and a plane of rotation (the plane in which the reactive force member can spin, the plane of rotation is perpendicular to the axis of rotation and approximately perpendicular to the heading direction) in which the reactive force member rotates. The plane of rotation is approximately parallel to a lateral motion plane (vertical and approximately perpendicular to the heading direction) defined by lateral motion (side-to-side) of the vehicle.

The reactive force member is designed and constructed to have a mass commensurate with weight of the vehicle to cause a change in the lateral motion (e.g., tipping motion (a rotational motion of the vehicle having an axis that extends in the approximate direction the vehicle is heading), side-to-side motion, etc.) when the reactive force member is torqued. In other words, an RF member of insufficient mass will not cause mitigation of the excessive lateral motion once torqued.

At 902, lateral motion of the vehicle is sensed while the vehicle is traveling, and the sensed lateral motion is deemed excessive relative to a lateral motion threshold. The threshold can be a value related to the degree of tip (e.g., thirty degrees), a value that indicates excessive variation from a known good vehicle heading, and so on. In other words, the excessive lateral motion can cause loss of control of the vehicle. If the lateral motion of the vehicle is deemed to not be excessive, the reactive force member will not be torqued.

At 904, torque is applied to the reactive force member for a predetermined time duration (e.g., seconds, milliseconds) in response to the excessive lateral motion (as determined relative to the threshold). At 906, a check is made for a reduction in the excessive lateral motion based on the applied torque. At 908, the torque is applied and the reduction in the excessive lateral motion is checked, recursively, until the excessive lateral motion is no longer excessive relative to the lateral motion threshold.

The method can further comprise adjusting an amount of the torque applied and the time duration based on the changes in the excessive lateral motion. For example, in a first application of torque, T1, for time duration, TD1, after which the reactive force member is disengaged and freewheels (begins winding down), if there is no detected reduction or in adequate reduction in the excessive lateral motion, the control system can control the drive system to initiate a second application of torque, T2, for time duration, TD2, after which the reactive force member is disengaged and freewheels (begins winding down), where T1>T2, and TD1>TD2. In other words, the typical scenario is multiple increasingly smaller bumps of torque on the reactive force member for correspondingly smaller time durations.

However, it is to be understood that intervening events can occur in the moving dynamics of the vehicle such that applied torque and time duration may change up or down in order to cause mitigation of the lateral (tipping) motion. Moreover, in order to effectuate a smooth transition from excessive lateral motion to vehicle stability, the reduction in excessive lateral motion should be performed smoothly so as to not alarm the driver into over-correcting or disrupting the ability of the driver to control the vehicle.

The method can further comprise torqueing the reactive force member in different rotational directions based on corresponding changes in the excessive lateral motion. The scenario is possible where the excessive lateral motion in one direction (e.g., to the right) is in the process of being reduced, but the driver causes the excessive lateral motion to then occur in the opposite lateral direction. Thus, the system then operates to apply torque to the reactive force member in the opposite rotational direction. In these situations, the back-and-forth mitigation can ultimately result in a steady state of the vehicle. However, in such situations, it can be the case that the control system interfaces to the vehicle systems to also then execute software instructions that reduce the ability of the driver to make matters worse, while the rollover prevention system operates to bring the vehicle back to a steady and stable state.

The method can further comprise mounting the reactive force member to a driver section of the vehicle and torqueing the reactive force member to mitigate excessive lateral tipping motion of a trailer section of the vehicle. For example, in a tractor-trailer two-part vehicle, the reactive force member can be mounted on the tractor part (the driver section) such that a detected tipping motion is translated to mitigation of rollover of the trailer part (and potentially both the tractor and trailer parts).

Figure 10:
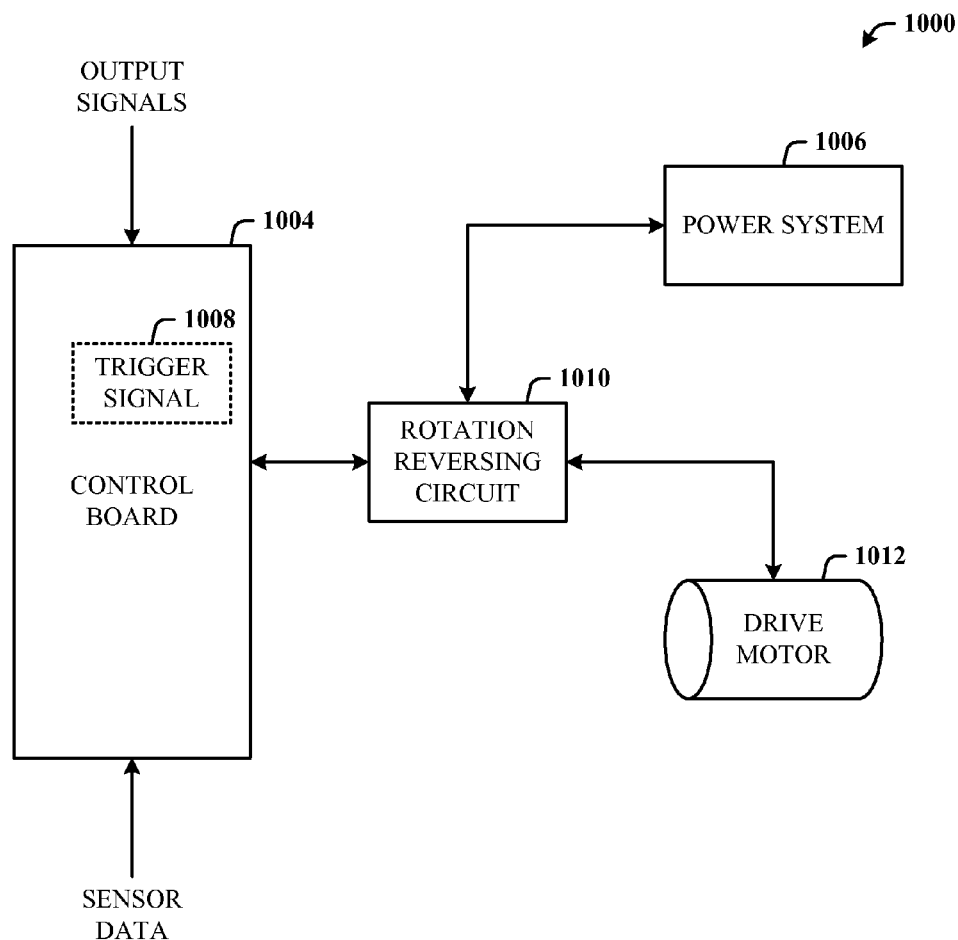
FIG. 10 illustrates a general block diagram of a control system that controls the drive motor.

FIG. 10 illustrates a general block diagram of a control system 1000 that controls a drive motor 1002. The control system 1000 comprises a control board 1004 that receives power from a power system 1006 (e.g., set of batteries), and receives and processes sensor data (e.g., from tilt sensing sensors such as one or more accelerometers and other suitable sensors) to generate the trigger signal 1008 which indicates excessive tipping motion. The control board 1004 can also comprise one or more controllers and memory, as well as other electronic components that enable receipt of data, the output of signals, and the execution of code to control a rotation reversing circuit 1010, which reverses power to the drive motor 1012 (similar to drive system 806). The control board 1004 can also comprise the capability for wired and/or wireless communications to any suitable receiver/transceiver component such as from/to wireless sensors or other mounted control boards. These and other functionality are now described when employing a more robust computing system.

Figure 11:
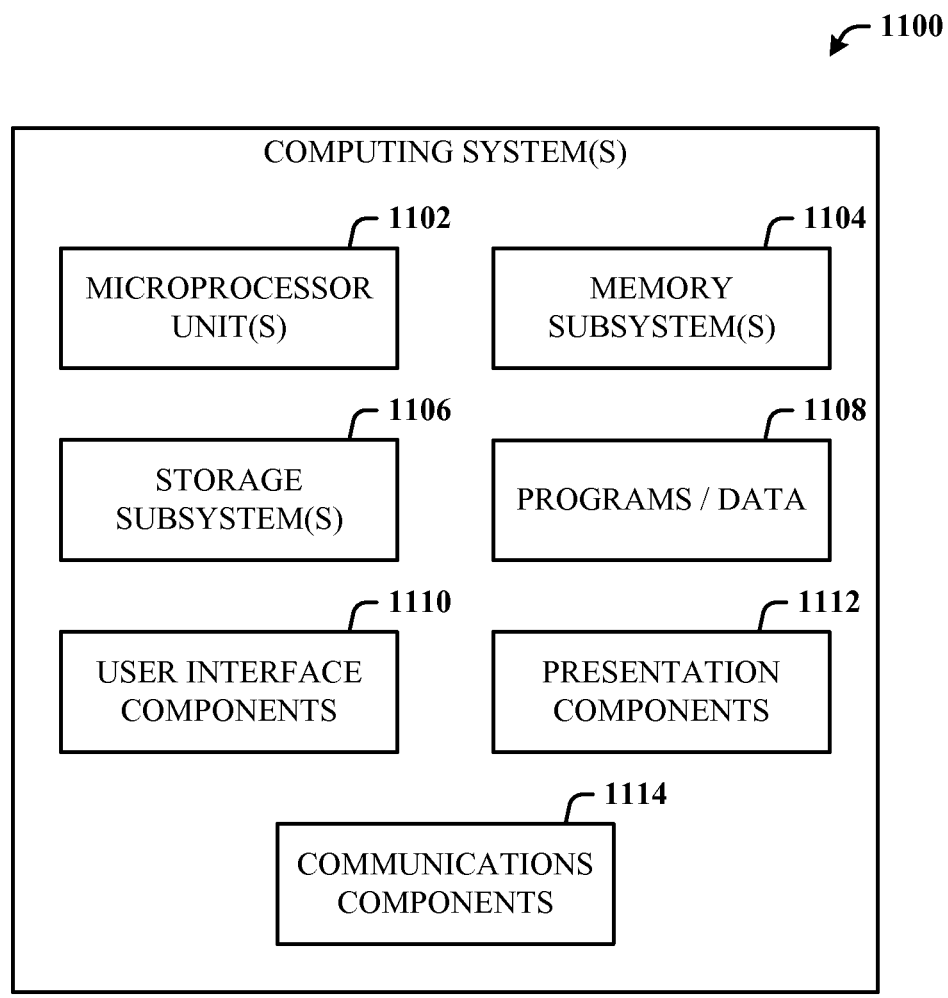
FIG. 11 illustrates a block diagram of a computing system that executes instructions of the counter-torque rollover prevention architecture in accordance with the disclosed architecture.

Referring now to FIG. 11, there is illustrated a block diagram of a computing system 1100 that executes the counter-torque rollover prevention architecture in accordance with the disclosed architecture. However, it is appreciated that the some or all aspects of the disclosed methods and/or systems can be implemented as a system-on-a-chip, where analog, digital, mixed signals, and other functions are fabricated on a single chip substrate.

In order to provide additional context for various aspects thereof, FIG. 11 and the following description are intended to provide a brief, general description of the suitable computing system 1100 in which the various aspects can be implemented. While the description above is in the general context of computer-executable instructions that can run on one or more computers, those skilled in the art will recognize that a novel implementation also can be realized in combination with other program modules and/or as a combination of hardware and software.

The computing system 1100 for implementing various aspects includes one or more microprocessing unit(s) 1102 (also referred to as microprocessor(s) and processor(s)), a computer-readable storage medium such as memory subsystem(s) 1104 (computer readable storage medium/media also include magnetic disks, optical disks, solid state drives, external memory systems, and flash memory drives), and internal system interconnections. The microprocessing unit(s) 1102 can be any of various commercially available microprocessors such as single-processor, multi-processor, single-core units and multi-core units of processing and/or storage circuits.

The memory subsystem(s) 1104 can include computer-readable storage (physical storage) medium such as a volatile (VOL) memory (e.g., random access memory (RAM)) and a non-volatile memory (NON-VOL) (e.g., ROM, EPROM, EEPROM, etc.). A basic input/output system (BIOS) can be stored in the non-volatile memory, and includes the basic routines that facilitate the communication of data and signals between components within the computer system 1100, such as during startup. The volatile memory can also include a high-speed RAM such as static RAM for caching data.

The internal system interconnections provide an interface for system components including, but not limited to, the memory subsystem(s) 1104 to the microprocessing unit(s) 1102. The internal system interconnections can comprise any of several types of bus structures that can further interconnect to a memory bus (with or without a memory controller), and a peripheral bus (e.g., PCI, PCIe, AGP, LPC, etc.), using any of a variety of commercially available bus architectures.

The computer system 1100 further includes machine readable storage subsystem(s) 1106 and storage interface(s) for interfacing the storage subsystem(s) 1106 to the internal system interconnections and other desired computer components and circuits. The storage subsystem(s) 1106 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) can include interface technologies such as EIDE, ATA, SATA, and IEEE 1394, for example.

One or more programs and data 1108 can be stored/cached in the memory subsystem(s) 1104 and/or storage subsystem(s) 1106, which include but are not limited to, a machine readable and removable memory subsystem (e.g., flash drive form factor technology). The one or more programs and data 1108 can include an operating system, one or more application programs, other program modules, and program data.

Generally, programs include routines, methods, data structures, other software components, etc., that perform particular tasks, functions, or implement particular abstract data types. All or portions of the operating system, applications, modules, and/or data can also be cached in memory (e.g., memory subsystem(s) 1104) such as the volatile memory and/or non-volatile memory, for example. It is to be appreciated that the disclosed architecture can be implemented with various commercially available operating systems or combinations of operating systems (e.g., as virtual machines).

The storage subsystem(s) 1106 and memory subsystem(s) 1104 serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer system 1100, and include volatile and non-volatile internal and/or external media that is removable and/or non-removable. For the computer system 1100, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer system 1100, programs, and data using user interface components 1110, which include but are not limited to, external user input devices such as a keyboard and a mouse, as well as by voice commands facilitated by speech recognition. Other external user input devices can include a microphone, an IR (infrared) remote control, a joystick, a game pad, camera recognition systems, a stylus pen, touch screen, gesture systems (e.g., eye movement, body poses such as relate to hand(s), finger(s), arm(s), head, etc.), and the like. The user can interact with the computer system 1100, programs, and data using onboard user input devices such a touchpad, microphone, keyboard, etc., where the computer system 1100 is a portable computer, for example.

These and other input devices are connected to the microprocessor unit(s) 1102 through input/output (I/O) device interface(s), but can be connected by other interfaces such as a parallel port, IEEE 1394 serial port, a game port, USB ports, an IR interface, short-range wireless (e.g., Bluetooth) and other personal area network (PAN) and short range communications technologies, etc. The I/O device interface(s) also facilitate the use of output peripherals such as printers, audio devices, camera devices, and so on, such as a sound card and/or onboard audio processing capability.

One or more presentation components 1112 such as graphics interface(s) (also commonly referred to as a graphics processing unit (GPU)) provide graphics and video signals between the computer system 1100 and external display(s) (e.g., LCD, plasma) and/or onboard displays (e.g., for portable computer). The graphics interface(s) can also be manufactured as part of the computer system board.

The computer system can operate in a networked environment (e.g., IP-based) using logical connections via a wired/wireless communications subsystem to one or more networks and/or other computers. The other computers can include workstations, servers, routers, personal computers, microprocessor-based entertainment appliances, peer devices or other common network nodes, and typically include many or all of the elements described relative to the computer system 1100. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer system 1100 connects to the network via a wired/wireless communications components 1114 (e.g., a network interface adapter, onboard transceiver subsystem, etc.) to communicate with wired/wireless networks, wired/wireless printers, wired/wireless input devices, and so on. The computer system 1100 can include a modem or other means for establishing communications over the network. In a networked environment, programs and data relative to the computer system 1100 can be stored in the remote memory/storage device, as is associated with a distributed system. It will be appreciated that the network connections shown are exemplary and other means of establishing a communications link between the computers can be used.

The computer system 1100 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A rollover prevention system, comprising:
a rotational member mounted in association with a vehicle, the rotational member having an axis of rotation in parallel with a heading of the vehicle, the rotational member mounted to enable rotation about the axis in a plane perpendicular to the heading of the vehicle, the rotational member having a mass such that when torque is applied to the rotational member, a counter torque is generated that mitigates a tipping motion of the vehicle;
a drive system mechanically coupled to the rotational member to apply the torque to the rotational member according to a predetermined time duration; and
a control system configured to control the drive system to apply the torque to the rotational member from an idle state of no rotation in response to a threshold triggered by an amount of the tipping motion.

2. The system of claim 1, further comprising a sensor system in communication with the control system, the sensor system deployed on the vehicle and configured to generate data that characterizes the tipping motion.

3. The system of claim 2, further comprising a power system configured to supply power to the drive system, the control system, and the sensor system, the power system mounted inside or outside of a housing that structurally supports the rotational member.

4. The system of claim 3, wherein the power system and the drive system are mounted on the rotational member, and rotate with the rotational member.

5. The system of claim 1, wherein the control system controls the drive system to apply multiple separate instances of torque to the rotational member based on state of the tipping motion.

6. The system of claim 1, wherein the control system regulates the torque applied to the rotational member based on at least one of time duration of the applied torque or variable power applied to the drive system.

7. The system of claim 1, wherein the rotational member, drive system, and control system are mounted on a tractor of a tractor-trailer vehicle, sense the tipping motion in the trailer, and apply counter torque to the tractor to mitigate the tipping motion of the trailer.

8. The system of claim 1, wherein the rotational member, drive system, and control system are mounted on a trailer of a tractor-trailer vehicle, sense the tipping motion in the trailer, and apply counter torque to the trailer to mitigate the tipping motion of the trailer.

9. A rollover prevention system, comprising:
- a flywheel mounted on a transport vehicle, the flywheel having an axis of rotation in parallel with a heading of the transport vehicle, the flywheel rotates in a plane that approximates a direction of a tipping motion of the transport vehicle, the flywheel having a mass commensurate with a loaded weight of the transport vehicle such that when torque is applied to the flywheel, the tipping motion is mitigated;
- a drive system mechanically coupled to the flywheel to apply the torque to the flywheel according to a predetermined time duration;
- a sensor system deployed on the transport vehicle and configured to generate data that characterizes at least the tipping motion; and
- a control system configured to interface to the sensor system and control the drive system, the drive system controlled to apply the torque to the flywheel from an idle state of no rotation in response to an excessive amount of the tipping motion.

10. The system of claim 9, further comprising a power system configured to supply power to the drive system and the control system and the sensor system, wherein the power system is a transport vehicle power system or an auxiliary power system that provides power only to the rollover protection system.

11. The system of claim 10, wherein the flywheel, the drive system, the power system, and the control system are structurally mounted in a single housing and, mechanically and electrically coupled for standalone operation, the housing securable to the transport vehicle.

12. The system of claim 9, wherein the control system controls the drive system to apply multiple separate instances of torque to the flywheel to mitigate the tipping motion.

13. The system of claim 9, wherein the control system regulates time duration of the torque applied to the flywheel based on data that characterizes effectiveness of the applied torque to mitigate the tipping motion.

14. The system of claim 9, wherein the transport vehicle comprises a load section via which a load is secured for transport and a driver section that facilitates the transport of the load, the flywheel mounted with the load section or with the driver section, the flywheel torqued to counter the excessive amount of tipping motion.

15. The system of claim 9, wherein the drive system mechanically couples to the flywheel by one of directly via a drive shaft of the drive system, via a gear drive system, via a chain drive system, via a belt drive system, or via a pressure plate friction system.

16. The system of claim 9, wherein the sensor system comprises a tipping motion sensor that enables sensing of the tipping motion, the tipping motion sensor located on a king pin of the transport vehicle.

17. A rollover prevention method, comprising:
- mounting a reactive force member to a vehicle, the reactive force member having an axis of rotation in parallel with a heading of the vehicle and a plane of rotation in which the reactive force member rotates, the plane of rotation approximately parallel to a plane defined by lateral motion of the vehicle, the reactive force member having a mass commensurate with weight of the vehicle to cause a change in the lateral motion when the reactive force member is torqued;
- sensing lateral motion of the vehicle while the vehicle is traveling, the sensed lateral motion deemed excessive relative to a lateral motion threshold, which excessive lateral motion can cause loss of control of the vehicle;
- applying torque to the reactive force member from an idle state of no rotation for a predetermined time duration in response to the excessive lateral motion;
- checking for a reduction in the excessive lateral motion based on the applied torque; and
- recursively applying the torque and checking for the reduction in the excessive lateral motion until the excessive lateral motion is no longer excessive relative to the lateral motion threshold.

18. The method of claim 17, further comprising adjusting an amount of the torque applied and the time duration based on the changes in the excessive lateral motion.

19. The method of claim 17, further comprising torqueing the reactive force member in different rotational directions based on corresponding changes in the excessive lateral motion.

20. The method of claim 17, further comprising mounting the reactive force member to a driver section of the vehicle and torqueing the reactive force member to mitigate excessive lateral tipping motion of a trailer section of the vehicle.

* * * * *